United States Patent Office 3,157,599
Patented Nov. 17, 1964

---

3,157,599
DRILLING FLUID
Walter E. Gloor, Wilmington, Del., assignor to Hercules Powder Company, Wilmington, Del., a corporation of Delaware
No Drawing. Filed July 7, 1961, Ser. No. 122,422
10 Claims. (Cl. 252—8.5)

This invention relates to a water based drilling fluid of the type used in drilling oil, gas, or other deep wells and to a method of reducing the water loss from drilling fluids.

In the drilling of wells, especially drilling by the rotary method, it is necessary to use a drilling fluid. The principal functions of a drilling fluid are to lubricate and cool the bit and drill stem; carry away cuttings while the drilling is in progress; keep the cuttings in suspension while drilling is shut down; prevent the flow of water, gas, or oil into the well and form an impermeable sheath or filter cake on the walls of the well to reduce water loss and provide support to prevent the collapse of the walls into the well.

The ability of a drilling fluid to accomplish these necessary functions depends primarily upon its physical properties. For example, the fluid must have a viscosity sufficiently high to keep drill cuttings suspended and to carry them from the bottom of the well, but low enough so that it can be easily circulated. In addition, the fluid must have sufficient gel strength to prevent settling of the solids from the fluid when circulation is stopped, but low enough to release the cuttings from the suspension when the fluid is agitated in the settling pits. These problems have been solved by the use of specific clays such as bentonitic clays which impart sufficient viscosity and gel strength to the fluids. However, the persistent and serious problem of water loss has never been completely solved. By water loss is meant the loss of water by pressure filtration through the filter cake on the walls of the well. Excessive water loss causes the formation of too thick a filter cake, resulting in the jamming of the drill. In addition, water flowing into the surrounding formations may cause hydration and swelling.

In the past a wide variety of materials has been added to drilling fluids in order to control water loss. Such materials as mica, pectate pulp, sulfonated rubber, starch and starch derivatives, hydrolyzed polyacrylonitrile, salts of poly(acrylic acid), cellulose and cellulose derivatives, etc., have been used. While such materials can prevent water loss, they often have to be used in such large amounts that they impart other undesirable characteristics to the drilling fluids in which they are incorporated. For example, starch and starch derivatives are subject to bacterial attack and decomposition; hydrolyzed polyacrylonitrile lowers gel strength and increases viscosity beyond the workable ranges, etc.

It has now been found that the water-soluble copolymers prepared from divinyl ether and maleic anhydride in mole ratios of about 1:2 and the water-soluble salts and partial esters thereof can be admixed with various drilling muds to produce improved drilling fluids that exhibit desirable water loss characteristics even in high calcium systems and good thermal stability and resistance to metal ions without imparting any undesirable characteristics.

Accordingly, this invention relates to a drilling fluid comprising an aqueous suspension of finely divided solid inorganic materials and as a water-loss preventive an agent selected from the group consisting of divinyl ether-maleic anhydride copolymers, salts of divinyl ether-maleic anhydride copolymers, and water-soluble partial esters of divinyl ether-maleic anhydride copolymers in an amount sufficient to reduce water loss but insufficient to adversely affect viscosity and gel strength.

The divinyl ether-maleic anhydride copolymers used as water-loss preventives in this invention are water-soluble linear copolymers having a reduced specific viscosity (RSV) of from about 0.75 to about 10.0 or even higher and are believed to have a configuration as follows:

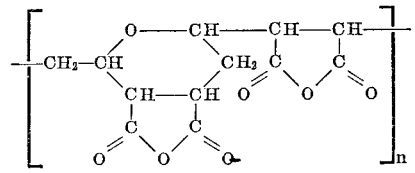

The anhydride groups, of course, quickly hydrolyze to free acids in the presence of water.

The term "reduced specific viscosity," which is a function of molecular weight, is used herein to designate the $\eta_{sp}/c$ determined on a 0.1% solution of the copolymer in a 1-molar solution of sodium hydroxide measured at a temperature of 25° C.

Exemplary of the salts and partial esters of these copolymers which are useful as water-loss preventives are the water-soluble salts such as the salts of alkali metals, as, for example, sodium, potassium, etc.; ammonium salts; half amide-half ammonium salts; salts of such amines as n-butylamine, t-butylamine, methylamine, ethylamine, dimethylamine, trimethylamine, diethylamine, triethylamine, etc.; mixed salts containing ammonia and a low molecular weight primary or secondary amine; the water-soluble partial esters such as those of methanol, ethanol, butanol, etc.; and the water-soluble partial esters of alkanol amines such as those of methanolamine, ethanolamine, isopropanolamine, diethanolamine, 2-amino-2-methyl-1-propanol, 2-amino-1-butanol, 2(dimethylamino)ethanol, etc. The amine groups of these alkanol amine esters can and often do form salts with the free carboxylic acid groups.

The partial esters of the copolymers can readily be prepared by various methods, as, for example, by refluxing a slurry or solution of the copolymer with the theoretical amount of alcohol.

In general, when preparing the salt, sufficient salt-forming component is added to the copolymer to completely hydrolyze the anhydride groups. However, since the copolymer itself is an efficient water-loss preventive, less than a stoichiometric amount of a salt-forming component can be used.

In preparing the drilling fluids of this invention, the copolymer water-loss preventive can be added by various methods. For example, the dry, finely divided solid can be mixed with a minimum amount of water to form a paste which can then be added to the mud. If a salt is desired, the required amount of salt-forming component can be added to the paste first and the preformed salt then added to the mud or the salt can be formed in situ.

The amount of the copolymer necessary to prevent water loss depends upon many factors, as, for example, the molecular weight of the copolymer, the nature of the drilling mud to which it is added, etc., and can best be determined by the driller in view of the specific task at hand. While the amount will vary greatly depending upon different factors, it will generally be within the range of from about 0.2% to about 2.0% by weight based on the weight of the drilling mud.

The water-loss preventives of this invention function equally well in the presence of the different mud types, such as fresh water mud, salt water mud, gypsum mud, etc., normally encountered in drilling.

The copolymers used in the preparation of the drilling fluids of this invention are produced by copolymerizing divinyl ether and maleic anhydride in an aromatic diluent at a mole ratio of about 1:2 using a free radical initiator as follows:

PREPARATION OF A TYPICAL DIVINYL ETHER-MALEIC ANHYDRIDE COPOLYMER

A polymerization vessel was charged with 9.8 parts of maleic anhydride at a temperature of 20° C., flushed with nitrogen, and then charged with 66 parts of nitrogen-sparged benzene. After dissolution of the maleic anhydride, 3.46 parts of distilled divinyl ether, 0.0048 part gaseous oxygen, and 1.08 parts of bromotrichloromethane were added. Then with vigorous agitation there was added 0.029 part of triethylborine, $(C_2H_5)_3B$, as a 1 M solution in n-heptane. Within 10 seconds copolymerization started and the solution became cloudy and then gelatinous. After about 20 hours the reaction stopped and the reaction mixture was repeatedly extracted with benzene and then dried under vacuum. The resulting divinyl ether-maleic anhydride copolymer was a white powder having an RSV of 1.8 and represented a conversion of 85%. The divinyl ether and maleic anhydride were present in the copolymer in the molar ratio of 1:2.

It will be understood that by conducting the copolymerization under various reaction conditions in the presence of different free-radical initiators and in the presence or absence of chain transfer agents (i.e., $CCl_4$, $BrCCl_3$, etc.) copolymers of various RSV's, i.e., various molecular weights, can be prepared.

It is pointed out that there are no general optimum characteristics which can be used to describe all drilling fluids nor is there a universal drilling fluid. The characteristics of drilling fluids used in different locations with different muds are by necessity drastically different. For example, the Gulf Coast muds require the use of a drilling fluid of low viscosity (about 15–20 cps.), minimum gel strength, and very high water loss prevention (preferably less than 6 ml. in 30 minutes). The so-called West Texas muds, on the other hand, require the use of a drilling fluid of high viscosity (about 80–100 cps.), maximum gel strength, slight water loss prevention (preferably less than 30 ml. in 30 minutes), and high salt tolerance.

The following examples present the preparation of typical drilling fluids for purposes of illustration, parts and percentages being by weight unless otherwise indicated.

The following standard tests mentioned in the examples are described in "Standard Field Procedure for Testing Drilling Fuids," 4th edition of The American Petroleum Institute (May 1957) on the pages indicated.

(1) Stormer viscosity—page 6
(2) Apparent viscosity (low-speed reading from direct indicating viscometer)—page 7
(3) Plastic viscosity (high-speed minus low-speed reading from direct indicating viscometer)—page 7
(4) Initial gel strength—page 6
(5) Ten-minute gel strength—page 6
(6) Water loss—pages 9 and 10
(7) Filter cake thickness—pages 9 and 10

A description of some of these tests (Nos. 1, 4, 5, 6, and 7) may also be found in "Principles of Drilling Mud Control," 8th Edition of the Industrial and Business Training Bureau, Division of Extension, University of Texas, Austin, Texas (1951).

Example 1

Drilling fluids were prepared with three types of drilling muds and the sodium salt of the divinyl ether-maleic anhydride copolymer described above. The formulas (in weight percentages) of the drilling muds used were as follows:

|  | Fresh Water Mud | Gypsum Mud | Salt Water Mud |
|---|---|---|---|
| Texas Clay | 8.8 | 7.97 | 7.82 |
| Bentonite Clay | 0.9 | 0.8 | 0.8 |
| Barium Sulfate | 26.3 | 26.3 | 23.4 |
| Calcium Sulfate |  | 0.17 |  |
| Barium Carbonate |  | 0.7 | 0.7 |
| Sodium Chloride |  |  | 11.0 |
| Water | 64.0 | 64.06 | 56.28 |

The drilling fluids tested were prepared by first making a paste of the copolymer with water, then adding aqueous sodium hydroxide until a gel formed. The resulting gel was then added to one of the above muds with agitation in the amount required to make a drilling fluid of the desired weight percentage. In all cases the drilling fluids were aged overnight and adjusted to a pH of 11. To show the effect of high temperature encountered in deep-well drilling, some of the fluids were subjected to a 16-hour aging period at a temperature of 150° C. prior to testing.

The specific drilling fluid used, weight percentage of copolymer salt in the drilling fluid, and the Stormer viscosity, initial gel strength, 10-minute gel strength, water loss, and filter cake thickness of each are tabulated in Table I.

TABLE I

| Drilling Fluid | Weight Percent of Copolymer Added | Stormer Viscosity, cps. | Initial Gel Strength, g. | 10-Minute Gel Strength, g. | Water Loss, ml. in 30 minutes | Filter Cake Thickness, inches |
|---|---|---|---|---|---|---|
| Fresh Water Mud | 0 | 51 | 80 | 80 | 76 | 0.462 |
|  | 0.25 | 40 | 3 | 4 | 11.6 | 0.062 |
|  | 0.50 | 63 | 3 | 4 | 5.0 | 0.035 |
|  | 0.75 | 112 | 7 | 8 | 4.1 | 0.044 |
| Fresh Water Mud subjected to heat treatment | 0 | 51 | 80 | 80 | 76 | 0.462 |
|  | 0.25 | 38 | 4 | 4 | 12.4 | 0.078 |
|  | 0.50 | 28 | 3 | 3 | 5.1 | 0.078 |
|  | 0.75 | 24 | 3 | 4 | 3.8 | 0.040 |
| Gypsum Mud | 0 | 13 | 10 | 15 | 68 | 0.344 |
|  | 0.25 | 43 | 4 | 5 | 10.4 | 0.064 |
|  | 0.50 | 86 | 5 | 6 | 5.8 | 0.039 |
|  | 0.75 | 126 | 15 | 15 | 4.8 | 0.030 |
| Gypsum Mud subjected to heat treatment | 0 | 13 | 10 | 15 | 68 | 0.344 |
|  | 0.25 | 43 | 4 | 5 | 14.5 | 0.101 |
|  | 0.50 | 24 | 4 | 5 | 7.4 | 0.119 |
|  | 0.75 | 28 | 4 | 4 | 5.4 | 0.045 |
| Salt Water Mud | 0 | 16 | 10 | 10 | 172 | 0.780 |
|  | 1.0 | 26 | 4 | 4 | 5.4 | 0.048 |
|  | 1.5 | 26 | 5 | 5 | 2.6 | 0.038 |

It can be seen from the above table that the addition of small amounts of the copolymer salt drastically reduced water loss and filter cake buildup without adversely affecting the viscosity or gel strength.

*Example 2*

Drilling fluids were prepared (as described in Example 1) from the fresh water mud (described in Example 1) and the sodium salt of a divinyl ether-maleic anhydride copolymer having an RSV of 1.4.

The weight percentage of copolymer salt in the drilling fluid and the Stormer viscosity, initial gel strength, 10-minute gel strength, water loss, and filter cake thickness of each fluid are tabulated below.

| Weight percent of copolymer added | 0 | 0.5 |
|---|---|---|
| Stormer Viscosity, cps | 51 | 47 |
| Initial Gel Strength, g | 80 | 4 |
| 10-Minute Gel Strength, g | 80 | 4 |
| Water Loss, ml. in 30 minutes | 76 | 6.5 |
| Filter Cake Thickness, inches | 0.462 | 0.036 |

*Example 3*

Drilling fluids were prepared (as described in Example 1) from the fresh water mud and the gypsum mud (described in Example 1) and the sodium salt of a divinyl ether-maleic anhydride copolymer having an RSV of 0.9.

The specific drilling fluid used, weight percentage of copolymer salt in the drilling fluid, and the Stormer viscosity, initial gel strength, 10-minute gel strength, and water loss of each are tabulated in Table II.

TABLE II

| Drilling Fluid | Weight Percent of Copolymer Added | Stormer Viscosity, cps. | Initial Gel Strength, g. | 10-Minute Gel Strength, g. | Water Loss, ml. in 30 minutes |
|---|---|---|---|---|---|
| Fresh Water Mud | 0 | 51 | 80 | 80 | 76 |
| | 0.50 | 36 | 2 | 3 | 6.0 |
| | 0.75 | 36 | 4 | 4 | 3.9 |
| Gypsum Mud | 0 | 13 | 10 | 15 | 68 |
| | 0.50 | 95 | 3 | 4 | 18.8 |

*Example 4*

A half amide-half ammonium salt of a divinyl ether-maleic anhydride copolymer having an RSV of 1.4 was prepared as follows: To 500 parts of benzene were added 50 parts of divinyl ether-maleic anhydride copolymer. Gaseous ammonia was bubbled through the resulting slurry for 1.5 hours during which time the temperature increased from 25° C. to 50° C. The resulting salt was filtered, washed with benzene, and dried. From nitrogen and oxygen analyses it was calculated that 68.5% of the starting maleic anhydride units were converted to ammonium maleamate units.

Drilling fluids were prepared by adding the dry half amide-half ammonium salt of the copolymer to a fresh water, low-solids mud containing 3.5% attapulgite clay. The weight percentage of the copolymer salt in the drilling fluid and the apparent viscosity, plastic viscosity, and water loss are tabulated below:

| Weight Percent of Copolymer Added | 0 | 0.9 |
|---|---|---|
| Apparent Viscosity, cps | 3 | 74 |
| Plastic Viscosity, cps | 1 | 38 |
| Water Loss, ml. in 30 minutes | 195 | 11 |

*Example 5*

Salt water drilling fluids were prepared from a low-solids salt water mud containing 3.5% attapulgite clay and the half amide-half ammonium salt of the divinyl ether-maleic anhydride copolymer described in Example 4.

The weight percentage of the copolymer salt added to the drilling fluid, the weight percentage of sodium chloride in the drilling fluid, and the apparent viscosity, plastic viscosity, and water loss are tabulated below.

| | 5% NaCl | | 26% NaCl | |
|---|---|---|---|---|
| Weight Percent of Copolymer Added | 0 | 1.2 | 0 | 1.2 |
| Apparent Viscosity, cps | 10.5 | 17 | 11 | 20 |
| Plastic Viscosity, cps | 2.0 | 11 | 3 | 10 |
| Water Loss, ml. in 30 minutes | 137 | 8 | 135 | 16 |

*Example 6*

A tert-butylamine salt of a divinyl ether-maleic anhydride copolymer having an RSV of 1.5 was prepared as follows: To 500 parts of benzene were added 50 parts of divinyl ether-maleic anhydride copolymer and an amount of tert-butylamine equal to 4 moles of amine per base mole of copolymer (a base mole of copolymer is one containing two anhydride units). The resulting slurry was refluxed for 5 hours, cooled, filtered, washed with benzene, and dried. From a nitrogen analysis it was calculated that 44% of the starting maleic anhydride units were converted.

Drilling fluids were prepared by adding the dry salt to a low-solids gypsum mud containing 3.5% attapulgite clay and 0.6% calcium sulfate.

The weight percentage of the copolymer salt in the drilling fluid and the apparent viscosity, plastic viscosity, and water loss are tabulated below:

| Weight Percent of Copolymer Added | 0 | 1.2 |
|---|---|---|
| Apparent Viscosity, cps | 3 | 38 |
| Plastic Viscosity, cps | 1 | 19 |
| Water loss, ml. in 30 minutes | 175 | 12 |

*Example 7*

A monoester-monoamine derivative of a divinyl ether-maleic anhydride copolymer having an RSV of 1.5 was prepared as follows: To 500 parts of benzene were added 50 parts of divinyl ether-maleic anhydride copolymer and an amount of dimethylaminoethanol, $(CH_3)_2NCH_2CH_2OH$, equivalent to 2 moles of alkanolamine per base mole of copolymer. The resulting slurry was refluxed for 5 hours, cooled, filtered, washed with benzene, and dried. From a nitrogen analysis it was calculated that 73% of the starting maleic anhydride units were converted. An infrared spectrum of the product showed the presence of both ester and amine salt groups.

Drilling fluids were prepared by adding the dry ester to the low-solids, 26% sodium chloride-containing mud described in Example 5.

The weight percentage of copolymer ester in the drilling fluid and the apparent viscosity, plastic viscosity, and water loss are tabulated below:

| Weight Percent of Copolymer Added | 0 | 1.2 |
|---|---|---|
| Apparent Viscosity, cps | 11 | 27 |
| Plastic Viscosity, cps | 3 | 15 |
| Water Loss, ml. in 30 minutes | 135 | 10 |

*Example 8*

In order to demonstrate the advantages of the drilling fluid of the instant invention over those of the prior art, drilling fluids were prepared from the standard drilling muds described in Example 1 using (1) the sodium salt of the divinyl ther-maleic anhydride copolymer described in column 3 (RSV 1.8), (2) medium viscosity sodium carboxymethylcellulose having a degree of substitution of 0.7, and (3) the sodium salt of poly(acrylic acid) sold under the trade name "Kylo." These drilling fluids were tested for water loss and the results compared in Table III.

TABLE III

| Drilling Fluid | Weight Percent of Water-Loss Preventive Added | Water Loss, ml. in 30 minutes |
|---|---|---|
| Fresh water mud | 0 | 76 |
| containing: | | |
| Sodium carboxymethylcellulose | 0.25 | 23.9 |
| The sodium salt of poly(acrylic acid) | 0.25 | 19.2 |
| The sodium salt of divinyl ether-maleic anhydride copolymer | 0.25 | 11.6 |
| Sodium carboxymethylcellulose | 0.50 | 17.4 |
| The sodium salt of poly(acrylic acid) | 0.50 | 9.0 |
| The sodium salt of divinyl ether-maleic anhydride copolymer | 0.50 | 5.0 |
| Fresh water mud, heat treated [1] | 0 | 76 |
| and containing: | | |
| Sodium carboxymethylcellulose | 0.50 | 15.8 |
| The sodium salt of poly(acrylic acid) | 0.50 | 10.0 |
| The sodium salt of divinyl ether-maleic anhydride copolymer | 0.50 | 5.1 |
| Gypsum mud | 0 | 68 |
| containing: | | |
| Sodium carboxymethylcellulose | 0.25 | 12.9 |
| The sodium salt of poly(acrylic acid) | 0.25 | 12.2 |
| The sodium salt of divinyl ether-maleic anhydride copolymer | 0.25 | 10.4 |
| Sodium carboxymethylcellulose | 0.50 | 9.0 |
| The sodium salt of poly(acrylic acid) | 0.50 | 8.6 |
| The sodium salt of divinyl ether-maleic anhydride copolymer | 0.50 | 5.8 |
| Gypsum mud, heat treated [1] | 0 | 68 |
| and containing: | | |
| Sodium carboxymethylcellulose | 0.25 | 17.8 |
| The sodium salt of poly(acrylic acid) | 0.25 | 18.1 |
| The sodium salt of divinyl ether-maleic anhydride copolymer | 0.25 | 14.5 |
| Sodium carboxymethylcellulose | 0.50 | 12 |
| The sodium salt of poly(acrylic acid) | 0.50 | 13 |
| The sodium salt of divinyl ether-maleic anhydride copolymer | 0.50 | 7.4 |
| Salt water mud | 0 | 172 |
| containing: | | |
| The sodium salt of poly(acrylic acid) | 1.0 | 48 |
| Sodium carboxymethylcellulose | 1.0 | 7.5 |
| The sodium salt of divinyl ether-maleic anhydride copolymer | 1.0 | 5.4 |

[1] Subjected to a 16-hour aging period at a temperature of 150° C. prior to testing.

What I claim and desire to protect by Letters Patent is:

1. A drilling fluid comprising an aqueous suspension of finely divided, solid, inorganic material and as a water-loss preventive an agent prepared from divinyl ether and maleic anhydride in the molar ratio of about 1:2 and selected from the group consisting of divinyl ether-maleic anhydride copolymers, alkali metal, ammonium, half amide-half ammonium, and alkyl amine salts of divinyl ether-maleic anhydride copolymers, water-soluble partial esters of lower monohydroxy aliphatic alcohols with divinyl ether-maleic anhydride copolymers and water-soluble partial esters of alkanol amines with divinyl ether-maleic anhydride copolymers.

2. The composition of claim 1 wherein the water-loss preventive is a sodium salt of a divinyl ether-maleic anhydride copolymer.

3. The composition of claim 1 wherein the water-loss preventive is the half amine-half ammonia salt of a divinyl ether-maleic anhydride copolymer.

4. The composition of claim 1 wherein the water-loss preventive is the tert-butylamine salt of a divinyl ether-maleic anhydride copolymer.

5. The composition of claim 1 wherein the water-loss preventive is the dimethylaminoethanol derivative of a divinyl ether-maleic anhydride copolymer.

6. In a process for drilling a well wherein there is circulated in the well an aqueous suspension of finely divided solid inorganic material, the method of forming a filter cake on the wall of said well to decrease the loss of fluid from said aqueous suspension contained therein into surrounding earthen formations which comprises incorporating in said aqueous suspension a water-loss preventive prepared from divinyl ether and maleic anhydride in the molar ratio of about 1:2 and selected from the group consisting of divinyl ether-maleic anhydride copolymers, alkali metal, ammonium, half amide-half ammonium and alkyl amine salts of divinyl ether-maleic anhydride copolymers, water-soluble partial esters of lower monohydroxy aliphatic alcohols with divinyl ether-maleic anhydride copolymers and water-soluble partial esters of alkanol amine with divinyl ether-maleic anhydride copolymers and contacting said wall of said well with the resulting aqueous suspension to form said filter cake thereon.

7. The method of claim 6 wherein the later-loss preventive is the sodium salt of a divinyl ether-maleic anhydride copolymer.

8. The method of claim 6 wherein the water-loss preventive is the half amide-half ammonium salt of a divinyl ether-maleic anhydride copolymer.

9. The method of claim 6 wherein the water-loss preventive is the tert-butylamine salt of a divinyl ether-maleic anhydride copolymer.

10. The method of claim 6 wherein the water-loss preventive is the dimethylaminoethanol derivative of a divinyl ether-maleic anhydride copolymer.

References Cited by the Examiner

UNITED STATES PATENTS

| 2,647,886 | 8/53 | Seymour | 252—8.5 |
| 2,718,497 | 9/55 | Oldham et al. | 252—8.5 |
| 3,085,077 | 4/63 | Floyd | 260—29.7 |

FOREIGN PATENTS

| 553,011 | 2/58 | Canada. |

JULIUS GREENWALD, *Primary Examiner.*